Patented May 23, 1939

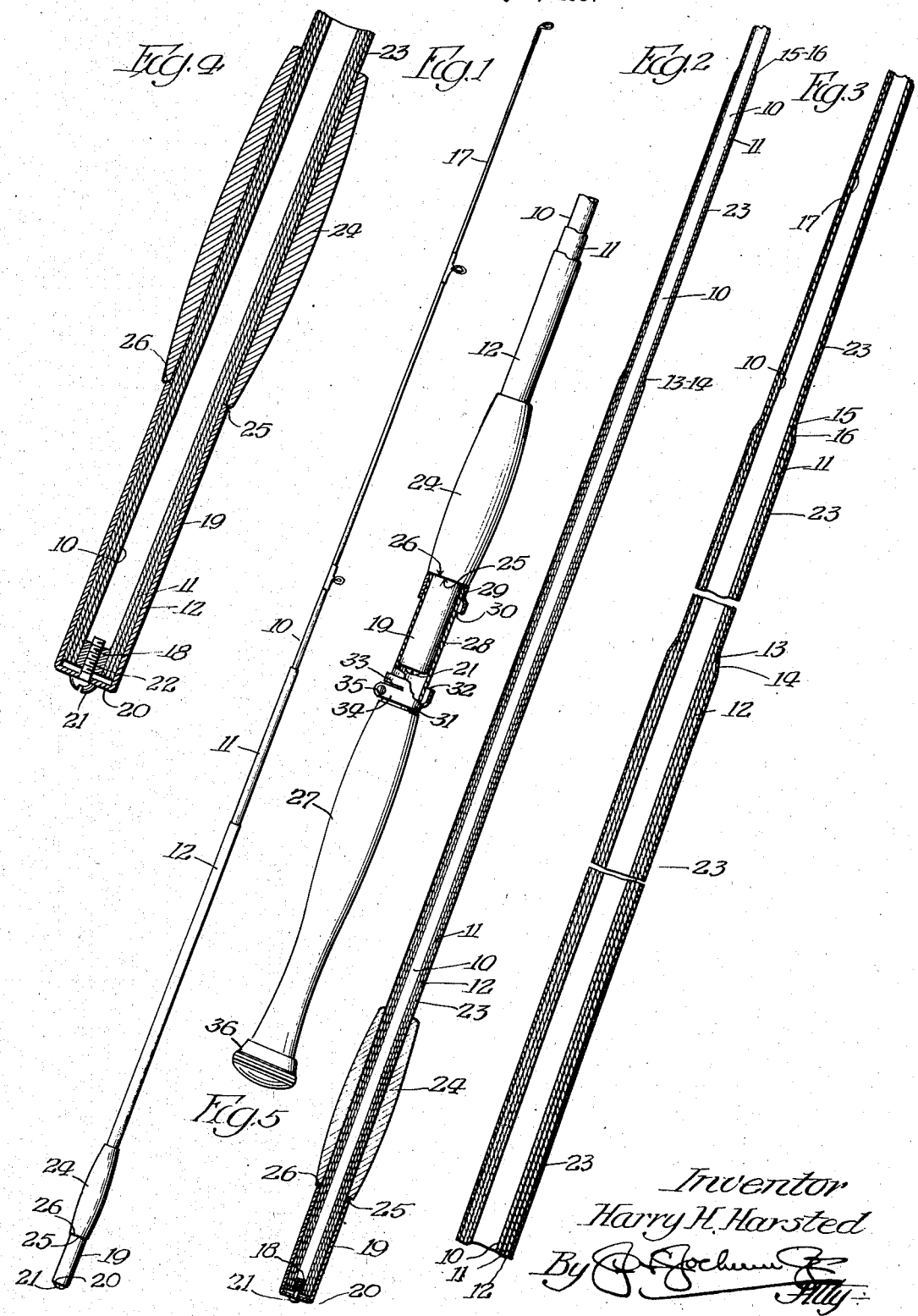

2,159,795

UNITED STATES PATENT OFFICE 2,159,795

FISHING ROD

Harry H. Harsted, Chicago, Ill., assignor to Gephart Manufacturing Co., Chicago, Ill., a corporation of Illinois Application May 1, 1937, Serial No. 140,135

5 Claims. (Cl. 43—18)

This invention relates to improvements in fishing rods, and one of the objects of the invention is to produce an improved rod of this character which will be light in weight, and constructed of a plurality of sections, one end of the sections nested with each other and having co-terminal extremities, said extremities being secured together against relative movement, the remaining nested portions of the sections working loosely or relatively with respect to each other, resulting in a substantially equal distribution of the strain throughout substantially the entire length of the rod section.

A further object is to provide a rod of this character, which when the rod is in use and subjected to lateral strain, will be shaped into a gradual arc for the entire length of the rod, that is from the butt end to the tip end.

Other and further objects will appear from the following specification and appended claims taken in connection with the drawing, and in which drawing Figure 1 is an elevation of a fishing rod section constructed in accordance with the principles of this invention.

Figure 2 is a longitudinal sectional view of a portion of the rod section, on a larger scale.

Figure 3 is a view similar to Figure 2, on a larger scale, of a portion of the rod section.

Figure 4 is an enlarged longitudinal, sectional view, of the butt end of the rod section.

Figure 5 is a view partly in elevation and partly in section of the butt end of the rod section, showing a handle applied to the end of the section.

In carrying this invention into operation, the rod section is formed of a plurality of members, the inner member 10 of which is preferably tubular, and one end thereof is nested with another tubular member 11, the external diameter of the member 10 and the internal diameter of the member 11 being such that the members will fit snugly. The member 11 also is nested with another member 12 and these two members snugly fit. The members 10, 11 and 12 vary in length from the outer member inwardly, that is the outer member 12 terminates at the point 13 and is preferably beveled as at 14, while the intermediate member 11 extends for a substantial distance beyond the end 13 of the member 12 and terminates at the point 15, the portion 16 of the extremity of the member 11 being beveled.

The inner member 10 extends for a considerable distance beyond the intermediate member 11 and the nested portions of the members are respectively of substantially uniform diameter in cross section throughout their entire lengths. The portion of the inner member 10 beyond the point 15 or the extremity of the intermediate member 11 is preferably tapered as at 17.

The members 10, 11 and 12 have co-terminal extremities at the tip of the butt end of the rod section, and these extremities are secured together against relative movement in any suitable manner, such as spot welding, brazing or the like, while the remaining nested portions of these members are free with respect to each other so as to permit of a relative movement of the members one with relation to the other when the rod is flexed.

Within the extremity of the inner member 10 is arranged a plug 18 secured in position in any suitable manner and sleeved over the butt end of the rod section is a ferrule 19, constructed of any desired or suitable material and is provided with a closed end 20. The ferrule 19 is of any suitable length and is of an internal diameter to fit snugly over the lower extremity of the outermost member 12. The ferrule may be secured in position in any suitable manner, and as a means for assisting in holding the ferrule in position there may be provided a screw 21 which passes through the closed end 20 of the ferrule and engages a threaded aperture 22 in the plug 18, so as to hold the ferrule 19 in proper position and against displacement.

If desired and in order to protect the rod sections thus formed as well as to provide a suitable finish, and thereby eliminate the necessity of coating or painting the rod sections, there may be provided a casing 23 constructed of any suitable hard, flexible, non-metallic material. This casing 23 is preferably of a normal diameter in cross section, slightly less than the external diameter of the respective rod members so that when the casing is subjected to the action of heat, it will become soft and pliable so that the casing may be sleeved over the rod section to completely encase the same. After it is in position the sleeve is shrunk upon the rod section and will be secured in position. The casing being of a flexible nature, the resiliency of the rod section will not be interfered with.

A handle 24 constructed of any desired or suitable material is sleeved upon the rod section thus formed and is held in position in any suitable manner. This handle may be of any desired size and configuration and the lower extremity thereof is preferably disposed in abutting relation to the extremity 25 of the ferrule 19, to provide a projecting circumferential shoulder 26.

A handle 27 is provided for the butt end of the rod section and this handle is provided with a socket 28, into which socket the ferrule 19 is adapted to be telescoped so that the circumferential shoulder 26 on the handle 24 will abut the end of the socket 28.

At the end of the socket 28 is arranged a peripheral collar 29 having an open seat 30 for the reception of one end of a reel base, the periphery of the socket 28 constituting the seat for the reel base. A collar 31 is arranged at the other end of the socket and is provided with an open seat 32 to cooperate with the seat 30 and to receive the other end of the reel base. A portion of the collar 31 is split as at 33 to form ears 34 which are adapted to be drawn together by means of a suitable fastening screw 35 to cause the collar 31 to grip the periphery of the socket 28 and thereby serve as a lock or a means for holding the reel against displacement.

The handle 27 constituting the butt of the rod section when the parts are assembled, may be of any desired size and configuration, and upon the free extremity thereof is arranged a cap 36 which may be of any desired size and configuration, and constructed of any suitable material.

With this arrangement and when in use, the rod may be gripped by the handle 27 with one hand and by the handle 24 with the other hand of the user, while the cap or button 36 at the extremity of the handle 27 may rest against a portion of the user's body.

With this improved construction it will be manifest that when the rod section is subjected to lateral strain, the rod section will be shaped into a gradual arc for the entire length of the rod, owing to the fact that the members 10, 11 and 12 will not only move one with relation to the other, but the lateral strain to which the rod is subjected will be substantially equally distributed throughout substantially the entire length of the rod section.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A fishing rod embodying a plurality of sections of substantial length, portions of said sections being nested and having co-terminal ends, said sections being secured together against relative movement only at the said ends, the remaining nested portions of said sections being disconnected and free for independent and relative movement, said sections increasing in length from the outside section inwardly.

2. A fishing rod embodying a plurality of sections of substantial length, portions of said sections being nested and having co-terminal ends, said sections being secured together against relative movement only at the said ends, the remaining nested portions of said sections being disconnected and free for independent and relative movement, the said sections increasing in length from the outer section inwardly, the nested portions of the sections being respectively of uniform diameter throughout their length.

3. A fishing rod embodying a plurality of sections of substantial length, portions of said sections being nested and having co-terminal ends, said sections being secured together against relative movement only at the said ends, the remaining nested portions of said sections being disconnected and free for independent and relative movement, and a casing of flexible hard non-metallic material sleeved over and shrunk upon said sections and contacting only the outer periphery of said sections.

4. A fishing rod embodying a plurality of sections of substantial length, portions of said sections being nested and having co-terminal ends, said sections being secured together against relative movement only at the said ends, the remaining nested portions of said sections being disconnected and free for independent and relative movement, and a casing of flexible hard non-metallic material sleeved over and shrunk upon said sections and contacting only the outer periphery of said sections and being substantially co-extensive with the combined length of said sections.

5. A fishing rod embodying a plurality of sections of substantial length, portions of said sections being nested and having co-terminal ends, said sections being secured together against relative movement only at the said ends, the remaining nested portions of said sections being disconnected and free for independent and relative movement, said sections increasing in length from the outside section inwardly, and a casing of flexible hard non-metallic material sleeved over and shrunk upon said sections and being substantially co-extensive with the combined length of said sections.

HARRY H. HARSTED.